US011113714B2

(12) United States Patent
Zhou et al.

(10) Patent No.: US 11,113,714 B2
(45) Date of Patent: Sep. 7, 2021

(54) FILTERING MACHINE FOR SPONSORED CONTENT

(71) Applicant: Yahoo Holdings, Inc., Sunnyvale, CA (US)

(72) Inventors: Ke Zhou, London (GB); Miriam Redi, Barcelona (ES); Mounia Lalmas, London (GB); Puneet Mohan Sangal, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 707 days.

(21) Appl. No.: 14/984,853

(22) Filed: Dec. 30, 2015

(65) Prior Publication Data
US 2017/0193545 A1 Jul. 6, 2017

(51) Int. Cl.
*G06Q 30/00* (2012.01)
*G06Q 30/02* (2012.01)

(52) U.S. Cl.
CPC ..... *G06Q 30/0243* (2013.01); *G06Q 30/0242* (2013.01); *G06Q 30/0244* (2013.01); *G06Q 30/0251* (2013.01); *G06Q 30/0254* (2013.01); *G06Q 30/0276* (2013.01); *G06Q 30/0277* (2013.01)

(58) Field of Classification Search
CPC .................................. G06Q 30/0207–0277
See application file for complete search history.

(56) References Cited

U.S. PATENT DOCUMENTS

| | | | | |
|---|---|---|---|---|
| 6,591,248 B1* | 7/2003 | Nakamura | ............. | G06Q 30/02 705/14.52 |
| 8,069,083 B2* | 11/2011 | Mahdian | ............ | G06Q 30/0274 705/14.7 |
| 8,312,022 B2* | 11/2012 | Wilde | ................... | G06F 16/957 707/740 |
| 8,572,011 B1* | 10/2013 | Sculley, II | ............. | G06N 20/00 706/13 |
| 8,600,809 B1* | 12/2013 | Kubica | ................... | G06Q 30/02 705/14.41 |
| 9,535,892 B1* | 1/2017 | Matthews | ............. | G06F 40/186 |
| 9,674,259 B1* | 6/2017 | Venkatasubramanian | ................... | H04L 67/02 |
| 9,712,860 B1* | 7/2017 | Waggoner | ........... | H04L 65/4084 |

(Continued)

OTHER PUBLICATIONS

Murphy, William. "Using Supervised Learning to Identify Descriptions of Personal Experiences related to Chronic Disease on Social Media." The Pennsylvania State University Graduate School of Information Sciences and Technology, May 2014. (Year: 2014).*

(Continued)

*Primary Examiner* — Luis A Brown
(74) *Attorney, Agent, or Firm* — Cooper Legal Group, LLC

(57) ABSTRACT

A filtering machine receives sponsored content and filters the sponsored content according to a quality metric generated by quality model circuitry and assigned to the instance of sponsored content. The quality model circuitry generates the quality metric in accordance with historical feedback received about other sponsored content and a collection of quality factors pertaining to the sponsored content. Based on the quality metric for the sponsored content, the filtering machine can effect service of the sponsored content to a user device for display thereon.

20 Claims, 6 Drawing Sheets

(56) References Cited

U.S. PATENT DOCUMENTS

| | | | |
|---|---|---|---|
| 2003/0167402 A1* | 9/2003 | Stolfo | H04L 51/12 726/23 |
| 2004/0006747 A1* | 1/2004 | Tyler | G06F 17/21 715/255 |
| 2004/0204238 A1* | 10/2004 | Aoki | G09F 27/00 463/30 |
| 2005/0021397 A1* | 1/2005 | Cui | G06Q 30/0251 705/14.42 |
| 2005/0169527 A1* | 8/2005 | Longe | G06F 40/40 382/177 |
| 2005/0240580 A1* | 10/2005 | Zamir | H04L 67/306 |
| 2006/0026060 A1* | 2/2006 | Collins | G06Q 30/0253 705/14.41 |
| 2006/0122879 A1* | 6/2006 | O'Kelley | G06Q 30/0254 705/14.46 |
| 2006/0149624 A1* | 7/2006 | Baluja | H04L 67/18 705/14.53 |
| 2006/0293995 A1* | 12/2006 | Borgs | G06F 16/951 705/37 |
| 2007/0038508 A1* | 2/2007 | Jain | G06Q 30/02 705/14.41 |
| 2007/0078707 A1* | 4/2007 | Axe | G06Q 30/02 705/14.41 |
| 2007/0150348 A1* | 6/2007 | Hussain | G06Q 30/0273 705/14.54 |
| 2007/0156514 A1* | 7/2007 | Wright | G06Q 30/0257 705/14.41 |
| 2007/0174343 A1* | 7/2007 | Fortuna | G06F 40/258 |
| 2007/0174872 A1* | 7/2007 | Jing | H04N 5/44543 725/46 |
| 2007/0244754 A1* | 10/2007 | Payne | G06Q 30/02 705/14.18 |
| 2007/0255702 A1* | 11/2007 | Orme | G06F 16/338 |
| 2008/0103887 A1* | 5/2008 | Oldham | G06Q 30/0277 705/14.71 |
| 2008/0249832 A1* | 10/2008 | Richardson | G06Q 30/0247 705/14.46 |
| 2009/0043648 A1* | 2/2009 | Mahdian | G06Q 40/04 705/14.39 |
| 2009/0106103 A1* | 4/2009 | Milana | G06Q 30/0242 705/14.41 |
| 2009/0132581 A1* | 5/2009 | Ahlberg | G06F 16/334 |
| 2009/0164897 A1* | 6/2009 | Amer-Yahia | G06F 3/00 715/703 |
| 2009/0300046 A1* | 12/2009 | Abouyounes | G06F 16/353 |
| 2010/0010895 A1* | 1/2010 | Gabrilovich | G06Q 30/02 705/14.54 |
| 2011/0125739 A1* | 5/2011 | Wexler | G06F 16/9535 707/734 |
| 2011/0131157 A1* | 6/2011 | Iyer | G06Q 30/0251 706/12 |
| 2011/0131485 A1* | 6/2011 | Bao | G06Q 30/0241 715/243 |
| 2011/0196739 A1* | 8/2011 | Zhang | G06Q 30/0254 705/14.52 |
| 2011/0218865 A1* | 9/2011 | Muthukrishnan | G06Q 30/08 705/14.71 |
| 2011/0264640 A1* | 10/2011 | Fontoura | G06F 16/22 707/706 |
| 2011/0313865 A1* | 12/2011 | Sinyagin | G06F 40/253 705/14.69 |
| 2012/0151523 A1* | 6/2012 | Prasad | H04N 21/25891 725/35 |
| 2013/0173269 A1* | 7/2013 | Adler | G06F 40/289 704/251 |
| 2013/0179169 A1* | 7/2013 | Sung | G06F 17/27 704/254 |
| 2013/0254021 A1* | 9/2013 | Damera-Venkata | G06Q 30/0241 705/14.46 |
| 2013/0282430 A1* | 10/2013 | Kannan | G06Q 30/06 705/7.29 |
| 2013/0332276 A1* | 12/2013 | Takami | G06Q 30/0263 705/14.53 |
| 2014/0122220 A1* | 5/2014 | Bradley | G06Q 30/0267 705/14.42 |
| 2014/0143057 A1* | 5/2014 | Lessin | G06Q 30/0269 705/14.58 |
| 2014/0156996 A1* | 6/2014 | Heppe | G06Q 30/00 713/175 |
| 2014/0204423 A1* | 7/2014 | Koutrika | G06F 3/1203 358/1.16 |
| 2014/0208234 A1* | 7/2014 | Amit | G06Q 50/01 715/753 |
| 2014/0214524 A1* | 7/2014 | Senaratna | G06Q 30/0242 705/14.41 |
| 2014/0280610 A1* | 9/2014 | Chen | H04L 51/32 709/206 |
| 2015/0058273 A1* | 2/2015 | Coden | H04L 63/1433 706/52 |
| 2015/0066958 A1* | 3/2015 | Krusell | G06Q 30/0204 707/749 |
| 2015/0154609 A1* | 6/2015 | Yuksel | G06Q 30/0185 705/318 |
| 2015/0213634 A1* | 7/2015 | Karmarkar | A61B 5/163 345/589 |
| 2015/0262229 A1* | 9/2015 | Brenner | G06Q 10/10 705/14.49 |
| 2015/0339940 A1* | 11/2015 | Aggarwal | G09B 7/02 704/235 |
| 2015/0375104 A1* | 12/2015 | Nishar | A63F 13/795 463/9 |
| 2016/0182410 A1* | 6/2016 | Janakiraman | G06F 40/30 709/206 |
| 2016/0189242 A1* | 6/2016 | Bhagwan | G06Q 30/0275 705/14.42 |
| 2016/0225030 A1* | 8/2016 | Iyer | G06Q 50/01 |
| 2017/0061013 A1* | 3/2017 | Deng | G06F 16/9535 |
| 2017/0127108 A1* | 5/2017 | Kar | H04N 21/2668 |
| 2017/0154356 A1* | 6/2017 | Trevisiol | G06Q 30/0272 |
| 2017/0164011 A1* | 6/2017 | Rimon | G06F 16/353 |
| 2017/0185590 A1* | 6/2017 | Tetreault | G06F 40/151 |
| 2017/0185591 A1* | 6/2017 | Tetreault | G06F 40/253 |
| 2018/0032997 A1* | 2/2018 | Gordon | G06Q 30/0269 |

OTHER PUBLICATIONS

Peterson, Kelly, et al. "Email Formality in the Workplace: A Case Study on the Enron Corpus." Association for Computational Linguistics, Jun. 2011. (Year: 2011).*

Sheika, Fadi Abu, et al. "Automatic Classification of Documents by Formality." IEEE, University of Ottawa, 2010. (Year: 2010).*

Heyligen, Francis and DeWaele, Jean-Marc. Formality of Language: Definition, Measurement, and Behavioral Determinants. Internal Report Center, Free University of Brussels, 1999. (Year: 1999).*

* cited by examiner

FILTERING MACHINE FOR SPONSORED CONTENT

TECHNICAL FIELD

This disclosure relates to machines and complex system architectures for filtering sponsored content.

BACKGROUND

Ensuring positive user experience with sponsored content is important to long-term user engagement and revenue for major online platforms (e.g., Yahoo!) and their affiliated websites or products. Promoting and displaying attractive sponsored content of suitable quality can be important to maximizing long-term user engagement with the platform, which in turn leads to increased web traffic for the particular major online platform. For example, if a user is provided with low quality sponsored content, that user may utilize a different online platform for their online needs (e.g., web searching, news, photos, etc.). On a macro scale, when many users experience low quality sponsored content, many users may select alternative online platforms, thereby decreasing the overall long-term user engagement with the particular online platform and, in turn, decreasing web traffic.

BRIEF DESCRIPTION OF THE DRAWINGS

The systems and methods may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
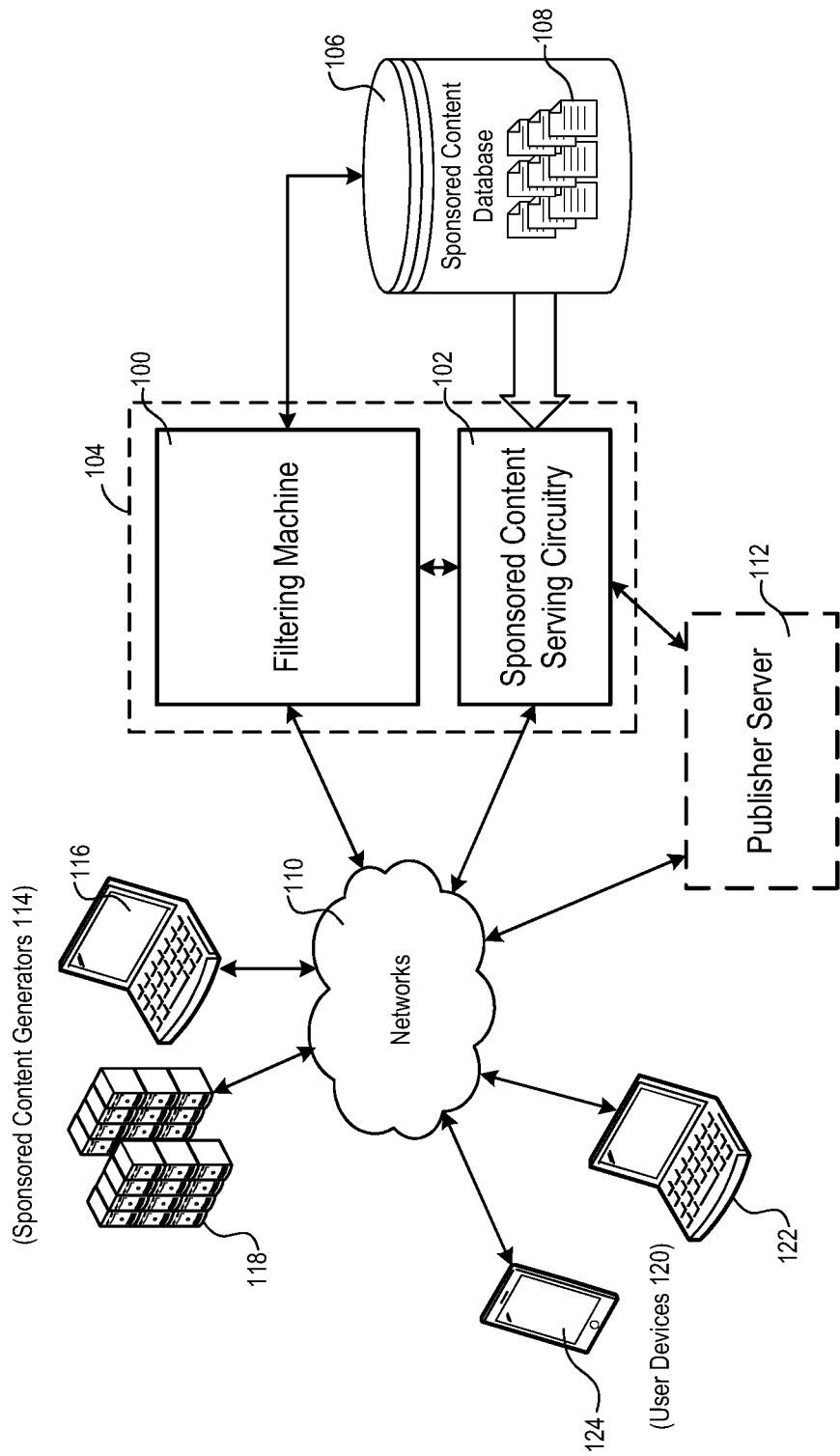
FIG. 1 is an example contextual setting for a filtering machine.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, circuitry, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, a filtering machine 100 may receive and filter sponsored content according to a quality metric. The quality metric may be generated by quality model circuitry and may be generated in accordance with historical feedback associated with other sponsored content. In this manner, a prediction may be made as to the quality of the sponsored content before the sponsored content is ever served to a user device for viewing (e.g., a pre-click quality). Thereafter, the quality metric can be used to filter out and/or rank sponsored content according to quality metrics of the different sponsored contents.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Turning now to FIG. 1, an example contextual setting for a filtering machine 100 is illustrated in accordance with various embodiments. The filtering machine 100 may provide a platform and circuitry for receiving, analyzing, filtering, and/or effecting service of sponsored content. The filtering machine 100 may be coupled to sponsored content server 102 (also known as an advertisement server). Alternatively, the filtering machine 100 and the sponsored content server 102 may coexist as a joined or interconnected machine, entity, and/or service 104. For example, the filtering machine 100 may be implemented as part of or in conjunction with a sponsored content server 102. The filtering machine 100 may be coupled to a sponsored content database 106 which may store many instances of sponsored content 108. The sponsored content server 102 may also be coupled to the sponsored content database 106 and may pull the sponsored content 108 stored therein to serve to user devices 120 for display thereon.

The filtering machine 100 may be coupled to one or more networks 110, which may include the Internet or an intranet. Other devices and/or system may also be connected to the networks 110, including, for example, a publisher server 112, one or more sponsored content generators 114, including, for example, content generator client device 116 and/or content generator servers 118. User devices 120 may also be connected to the networks 110, including, for example, a computer 122 (e.g., laptop) and/or a smartphone 124. The user devices 120 may be a computing device which allows a user to connect to a network 110, such as the Internet. Examples of a user device include, but are not limited to, a personal computer, personal digital assistant ("PDA"), a laptop, a smartphone, a cellular phone, a tablet, or other electronic device. The user device 102 may include a keyboard, keypad, a touch screen interface, or a cursor control device, such as a mouse, or a joystick, a display device, a remote control, and/or any other device operative to view webpages including content and sponsored content. In one embodiment, the user device 102 is configured to request and receive information from the networks 110, for example, using a web browser, such as INTERNET EXPLORER® (sold by Microsoft Corp., Redmond, Wash.) or FIREFOX® (provided by Mozilla).

In one embodiment, the publisher server 112 provides an interface to the networks 110 and/or provides its web pages over the network 110, for example, to the user devices 120. The publisher server 112 may be a web server that provides the user device 120 with pages (including sponsored content) that are requested over the networks 110, such as by a user of the user device 120. In particular, the publisher server 112 may provide a web page, or a series of web pages that are provided by the publisher server 112 when requested from the user devices 120. For example, the publisher may be a news organization, such as CNN® that provides all the pages and sites associated with www.cnn.com. Accordingly, when the user devices 120 request a page from www.cnn.com, that page is provide over the network 110 by the publisher server 112. As described below, that page may include space or slots for sponsored content (e.g., advertising space or slots) that are filled with advertisements viewed with the page.

The publisher server 112 may be operated by a publisher that maintains and oversees the operation of the publisher server 112. In one embodiment, the publisher is a separate entity from an entity that operates the sponsored content server 102. In such an instance, the operator of the sponsored content server 102 may operate as an advertisement broker to provide or serve sponsored content on webpages published by other publishers. In another embodiment, the publisher is the same as or a related entity as the entity that operates the sponsored content server 102. In this approach, the publisher server 112 and the sponsored content 102 are co-operated by a joint publishing operator that provides both the published webpages and the sponsored content inserted within the published webpages. In some approaches, the joint publishing operator may also generate and provide content (e.g., news stories, articles, videos, etc.) that can be provided on the published webpages.

A publisher database may be coupled with the publisher server 112 and may store the publisher's pages or data that is provided by the publisher server 112. The pages that are stored may have ad slots for displaying advertisements. The publisher database may include records or logs of at least a subset of the requests for data/pages and ads submitted to the publisher server 112. In one example, the publisher database may include a history of Internet browsing data related to the pages provided by the publisher server 112. In one embodiment, the publisher database may store copies of sponsored content from a number of advertisers, which may be copies of the sponsored content 108 stored within the sponsored content database 106. In addition, the publisher database may store records on the advertisements that are shown and the resulting impressions, clicks, and/or actions taken for those advertisements. The data related to advertisement impressions, clicks and resulting actions may be stored in either the publisher database and/or another database managed by the sponsored content server. Alternatively, in the case of a joint publisher, the sponsored content 108 may exist in and be served from the sponsored content database 108 by the publisher, for example, via the publisher server 112.

In some embodiments, the sponsored content server 102 provides the sponsored content for display in web pages, such as the pages provided by the publisher server 112. In one embodiment, the sponsored content server 102 is coupled with the publisher server 112 for providing ads on the publisher's web pages. An advertiser (e.g., a company or service provider advertising a product or service) may pay the publisher or an advertisement broker for advertising space on the publisher's page or pages provided via the publisher server 112. A broker may oversee the sponsored content server 102 by providing sponsored content to the publisher server 112, e.g., through the networks 110 or directed therebetween. Alternatively, the sponsored content server 102 may provide the sponsored content to user devices 120 directly in coordination with the webpages provided by the publisher server 112, for example, in response to an advertisement call included in the provided web page. The broker may pay the publisher for each impression, click, and/or conversion from the ads displayed on the publisher's pages, which the broker then recoups from the advertisers. Alternatively, if the published webpage is provided by the same entity as the operator of the sponsored content server (e.g., in an instance where a publisher manages their own advertising service), such a publisher may directly charge the advertisers for sponsored content displayed on their own webpages.

The sponsored content 108 may include advertisements, stories, images, videos, clips, soundbites, and/or any other type of sponsored content 108 as may be commonly served or otherwise provided to end users operating user devices 120 while using the Internet or browsing webpages provided by a publisher server 112. In certain embodiments, the sponsored content 108 comprises advertisements that further comprise at least one image and text associated with the image, which image and associated text may be displayed to an end user. In various embodiments, the advertisements are native advertisements, which are advertisements that are inserted within other content or documents (e.g., within lists of content, such as search results or news stories) with a unified appearance that is similar to that of the non-sponsored content. In such an approach, the advertisements adhere to a set of rules that dictate various aspects of the appearance and/or text of the native advertisement. The native advertisement may include a static or moving image and associated text, which text may be presented in a manner similar to the text describing the other non-sponsored content so as to provide a uniform appearance or presentation of the sponsored and non-sponsored content. The term "sponsored content" may mean "advertisements" (or "ads"), and vice versa and, in certain embodiments, the terms may be used interchangeably.

In accordance with various embodiments, the filtering machine 100 communicates with sponsored content generators 114. The sponsored content generators 114 may be advertisers (e.g., corporations) or, alternatively, are advertisement entities that generate sponsored content on behalf of the advertisers. The sponsored content generators 114 may provide to the filtering machine 100 candidate sponsored content that is to be displayed on user devices, for example, in the form of an advertisement or a native advertisement. The sponsored content generators 114 may provide the candidate sponsored content to the filtering machine 100 and/or to the sponsored content server 102 for storage in the sponsored content database 106. Additional details of these processes are provided further below.

Figure 2:
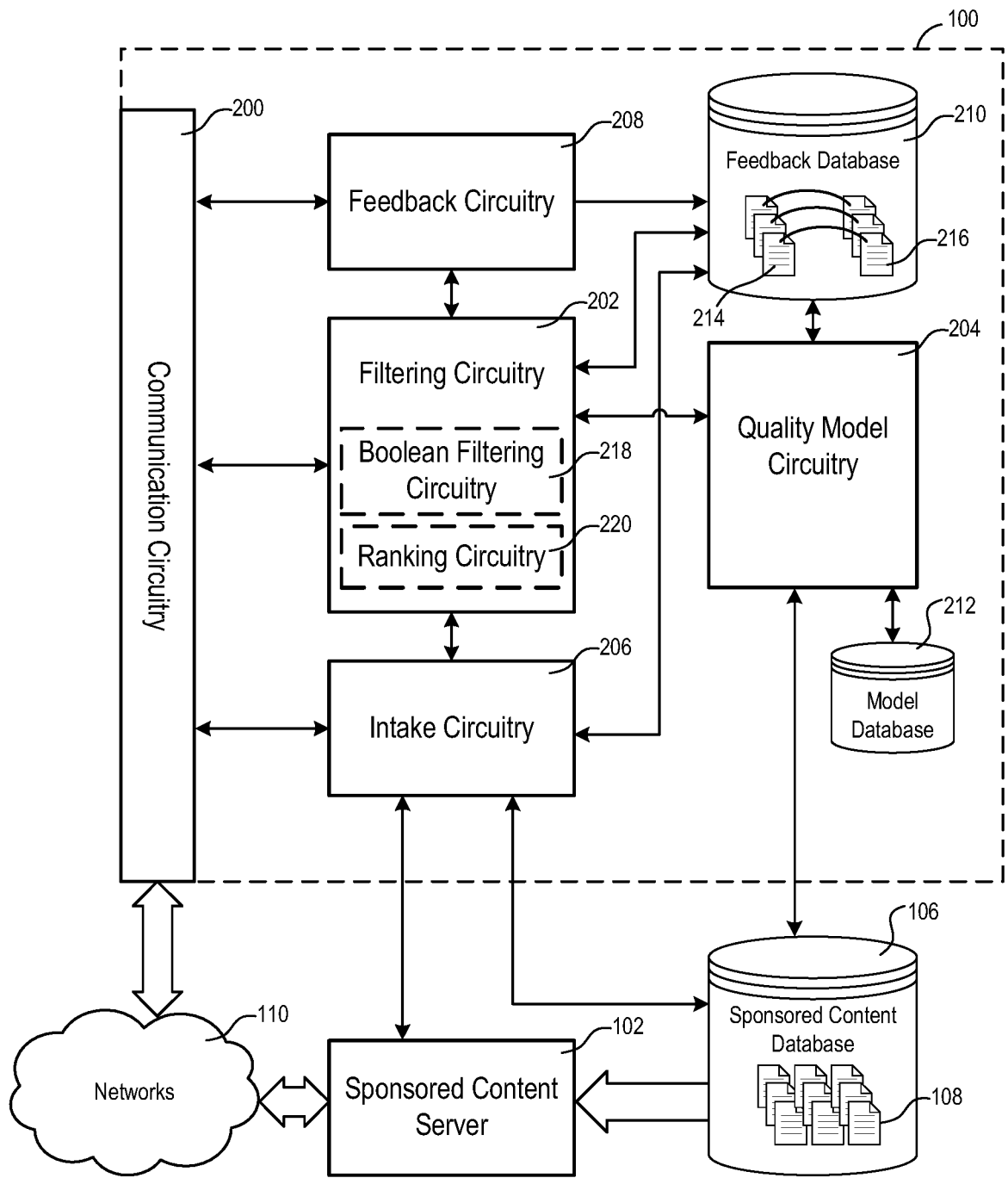
FIG. 2 is an example block diagram of a system architecture of a filtering machine.

Turning now to FIG. 2, an example block diagram of system architecture of the filtering machine 100 is shown in accordance with various embodiments. The filtering machine 100 may include communication circuitry 200, filtering circuitry 202, quality model circuitry 204, intake circuitry 206, and/or feedback circuitry 208. The filter machine 100 may also include or otherwise be coupled to a feedback database 210 and/or a model database 212.

The communication circuitry 200 may include various communication interfaces between the filtering machine 100 and other external components. The communication circuitry 200 may be connected or configured to connect to the networks 210, including the Internet or an intranet, to enable the filtering machine 100 and the system circuitry therein to communicate with other systems and devices. The communication circuitry 200 may include wireless and/or wired communication hardware and may implement wired and/or wireless communication protocols such as, for example, Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols, or wireless communication protocols such as Bluetooth, Wi-Fi, WLAN, near field communication protocols, cellular protocols (2G, 3G, 4G, LTE/A), and/or other wired or wireless protocols. Additionally, the communication circuitry 200 may include system buses to effect intercommunication between various elements, components, and circuitry portions of the filtering machine 100 (e.g., via one or more buses, computer component interfaces, or peripheral component interfaces). Example system bus implementations include PCIe, SATA, and IDE-based buses.

Further, the communication circuitry 100 may couple to the feedback database 210 and/or the model database 212 internally via system busses if internally maintained, or externally via externally-facing network interfaces if externally maintained. For example, although the feedback database 210 and the model database 212 are illustrated as maintained within the filtering machine 100, each may instead be implemented on a separate storage device or server which may be coupled to the filtering machine 100 directly or via the networks 110 (e.g., via an intranet or the Internet). Similarly, although all the circuitry elements are illustrated as existing within the filtering machine 100, some circuitry elements may be housed or implemented in physically distinct or separate locations or devices, such as separate servers or computers. In such an approach, the communication circuitry 200 may interconnect the various operating circuitry elements such that they cooperate as described further below.

Figure 3:
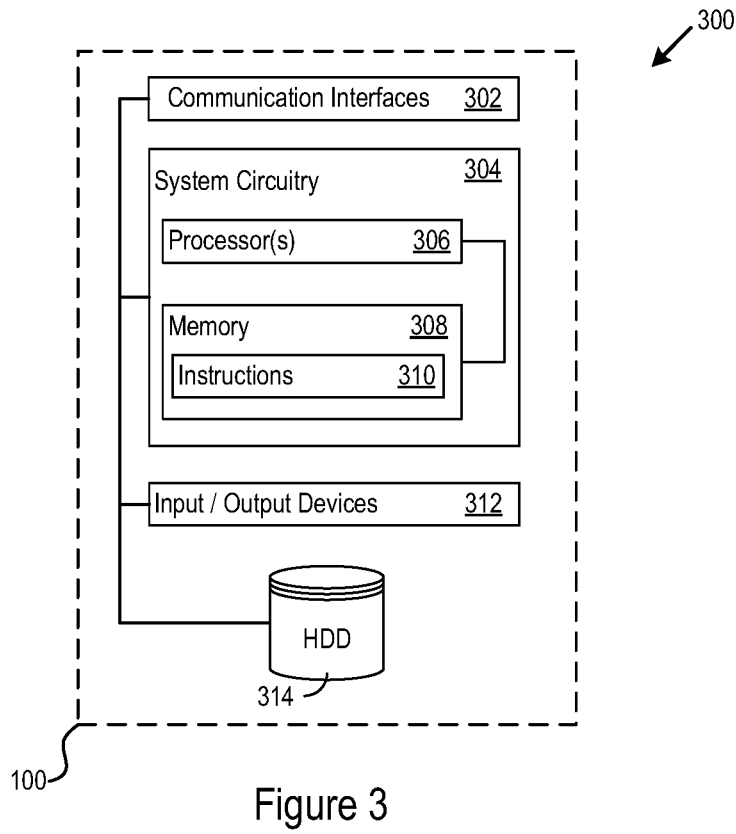
FIG. 3 is an example block diagram of a specific implementation of the machine of FIG. 1.

With brief reference to FIG. 3, an example block diagram of a specific implementation 300 of the filtering machine 100 is illustrated in accordance with various embodiments. In one approach, the filtering machine 100 includes system circuitry 304 to support implementation of the various circuitry elements and functionality discussed above with respect to FIG. 2 and elsewhere. In one embodiment, the system circuitry 304 includes processors 306, memory 308, and/or other circuitry. The processors 306 may be connected to the memory 308 and may comprise a memory system including a plurality of memory devices collocated or distributed across multiple systems. The memory 308 may store control instructions 310 and/or operational parameters for the control instructions, datasets, and other information. The control instructions 310 may be executed by the processor 306 to implement any of the functions described below, according to a configuration set by various operational parameters. In some embodiments, various circuitry elements of the filtering machine 100 may be implemented by the system circuitry 304. For example, the filtering circuitry 202, quality model circuitry 204, intake circuitry 206, feedback circuitry 208, the feedback database 210, and/or the model database 212 may be implemented in whole or in part by one or more instances of the system circuitry 304.

As shown in the specific implementation 300, the filtering machine 100 may also include communication interfaces 302, which may correspond to communication circuitry 200 shown in FIG. 2. The filtering machine 100 may also include one or more input/output devices 312 to enable for example, local maintenance engineers to interact with the filtering machine 100. For example, the input/output devices 312 may include a display, other human interface devices, and/or other communication interfaces to enable local or remote interaction therewith. The filtering machine 100 may include a hard drive disc 314 internally maintained or otherwise coupled thereto. The hard drive disc 314 may include copies of the operating instructions 310, as well as may provide the storage locations to implement the feedback database 210 and/or the model database 212 shown in FIG. 2. In certain embodiments, the filter machine 100 is implemented as or on one or more server devices or as a stand-alone computing device that may be interconnected to other devices or to the networks 110.

Figure 4:
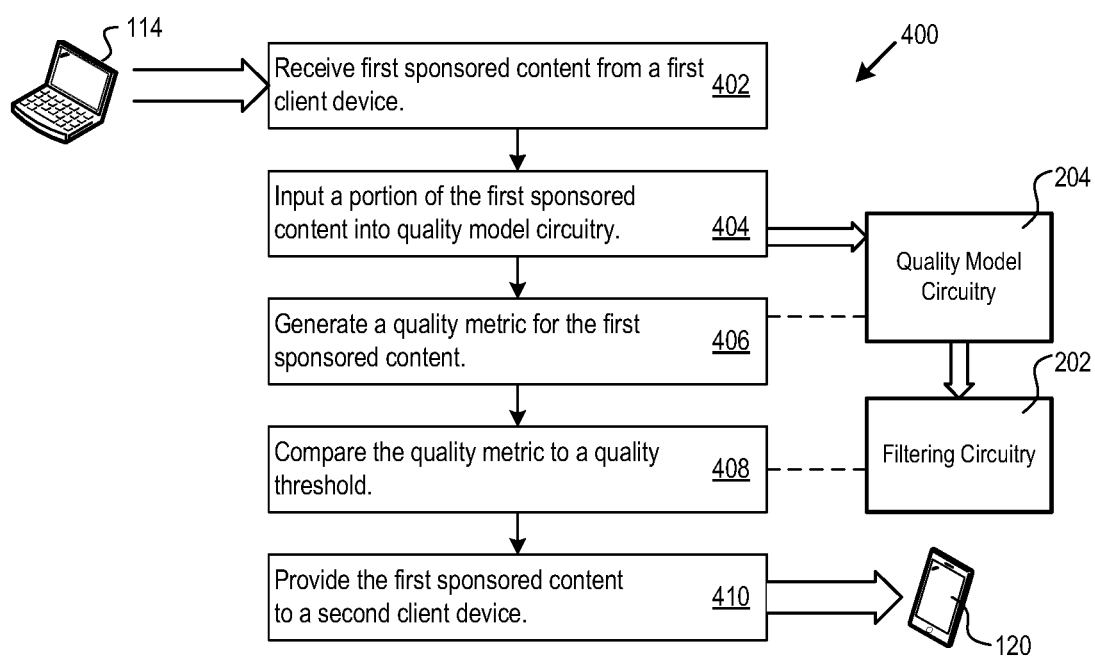
FIG. 4 shows an example flow diagram of logic that the machine may implement.

Operations of the filtering machine 100 and its various circuitry elements are described with simultaneous reference to FIG. 2 and FIGS. 4-6. FIG. 4 illustrates an example flow diagram of logic 400 that the filtering machine 100 may implement in various embodiments. For instance, the filtering circuitry 202 and/or intake circuitry 206 may be configured to implement some of all of the logic 400 shown in FIG. 4. The filtering circuitry 202 may receive first sponsored content from a first client device, in this instance, from a sponsored content generator 114 (402). In various approaches, the first sponsored content is an instance of candidate sponsored content uploaded by the sponsored content generator 114 for service as an advertisement to the user devices 120. In one approach, the filtering circuitry 202 receives the first sponsored content from the sponsored content generator 114, for example, via communication circuitry 200 and via the networks 110. In another approach, intake circuitry 206 receives the first sponsored content from the sponsored content generator 114 via communication circuitry 200 and via the networks 110. The intake circuitry 206 can cooperate with the filtering circuitry 202 to provide to the filtering circuitry 202 the first sponsored content and/or access to the first sponsored content stored somewhere within the system. In one approach, the intake circuitry 206 operates as the primary conduit for incoming sponsored content or advertisements from the sponsored content generators 114.

Thereafter, the filtering circuitry 202 or the intake circuitry 206 may store the first sponsored content within the sponsored content database 106, or in another separate database (e.g., a holding tank) prior to final storage in the sponsored content database 106. In one example, the feedback database 210 can maintain copies of the sponsored content 214 that correspond to the sponsored content 108 stored in the sponsored content database 106. The filtering circuitry 202 or the intake circuitry 206 can direct the received first sponsored content to the feedback database 210 for storage therein.

Alternatively, the sponsored content generators 114 may provide the first sponsored content to the sponsored content server 102, which is in turn stored on the sponsored content database 108. The filtering circuitry 202 and/or the intake circuitry 206 may have access to the sponsored content database 106 and can receive and/or copy the received first sponsored content stored on the sponsored content database 106. The sponsored content server 102 may communicate with the filtering machine 100 to inform the filtering machine 100 of the presence and/or location of the newly received candidate sponsored content. In such an approach, the filtering circuitry 202 can still be viewed as having received the first sponsored content from the sponsored content generator 114 (e.g., from a first client device) although such receipt is effected indirectly.

Once the first sponsored content is received, the filtering circuitry 202 can input a portion (partial or entirety) of the first sponsored content into the quality model circuitry 204 (404). This may entail the filtering circuitry 202 communicating the portion of the first sponsored directly into the quality model circuitry 204. Alternatively, this may entail the filtering circuitry 202 communicating the presence of and/or location of the first sponsored content to the quality model circuitry 204, for example, as is stored in sponsored content database 106, feedback database, or elsewhere.

The quality model circuitry 204 is configured to generate a quality metric for the first sponsored content (406). The quality model circuitry 204 may be implemented within the filtering machine 100 (e.g., with processors 306). Alternatively, the quality model circuitry 204 may be implemented on another system, server, or platform, which may be co-operated with the filtering machine 100. In another example, the quality model circuitry 204 is implemented as a service provided by another service provider, for example through the Internet. The quality model circuitry 204 may utilize data stored within a model database 212, which may include, for example, one or more predictive models and/or sets of trained coefficients for the various predictive models. The model database 212 may be stored internally or externally from the filtering machine 100.

In one embodiment, the quality metric may be generated according to historical feedback associated with other sponsored content based on a plurality of quality factors upon which the first sponsored content can be objectively judged. The quality metric may be a numerical value, for example, a value between 0 and 1, or between another set of values. In another example, the quality metric is Boolean value, such as 0 or 1, for example, as may indicate whether the first sponsored content is of suitable quality and/or includes a particular feature or aspect.

The quality model circuitry 204 may implement a predictive model that is trained using feedback data received regarding other sponsored content and the other sponsored content itself to provide the quality metric. The quality metric may be a prediction of the quality of the first sponsored content based on a number of quality factors given historical feedback received about the other sponsored content or advertisements. In one example, the quality metric is a prediction of the offensiveness of the first sponsored content. Additional detailed description of the operation of the quality model circuitry 204 is provided further below.

After the quality model circuitry 204 generates the quality metric for the first sponsored content, the filtering circuitry 202 may receive the quality metric. The filtering circuitry 202 may then perform filtering operations on the first sponsored content. In one example, the filtering circuity 202 includes a quality threshold. The filtering circuitry 202 may compare the received quality metric for the first sponsored content to the quality threshold (408).

In one approach, the filtering circuity 202 includes Boolean filtering circuitry 218 that performs Boolean filtering on the received sponsored content (e.g., the first sponsored content). If the Boolean filtering circuitry 218 determines that the quality metric exceeds the quality threshold, the filtering circuitry 202 may effect provision of the first sponsored content to a second client device (e.g., the user device 120) for display thereon (410). For example, if the quality metric exceeds the quality threshold, then the Boolean filtering circuitry 218 may flag or designate the received first sponsored content as of suitable quality for displaying. This flag may be set or stored within the sponsored content database 106 and/or the feedback database 210 and associated with the first sponsored content, for example, in a serving table. The setting of the flag or other indication associated with the first sponsored content indicates to the sponsored content server 102 that the sponsored content server 102 may serve the positively flagged first sponsored content to the user devices 120.

In another example, if the quality metric exceeds the quality threshold, the filtering circuitry 202 may enable the received first sponsored content to be saved in the sponsored content database 106 and enabled to be served to user devices 120. In this approach, the presence of the first sponsored content within the sponsored content database 106 indicates that the first sponsored content is of suitable quality to be served and displayed. Thus, the sponsored content server 102 may simply serve any and all sponsored content within the sponsored content database 106 to user devices 120.

In one approach, if the quality metric does not exceed the quality threshold, then the Boolean filtering circuitry 218 may flag or designate the received sponsored content as of lower quality or of unsuitable quality for displaying, or may prevent the first sponsored content from being stored within the sponsored content database 106. In one example, if the first sponsored content is deemed of poor quality, the first sponsored content may still be served, however, its service may be at a reduced frequency, with an increased price to the advertiser, or only when sponsored content of good quality is unavailable for a given impression or opportunity.

Figure 5:
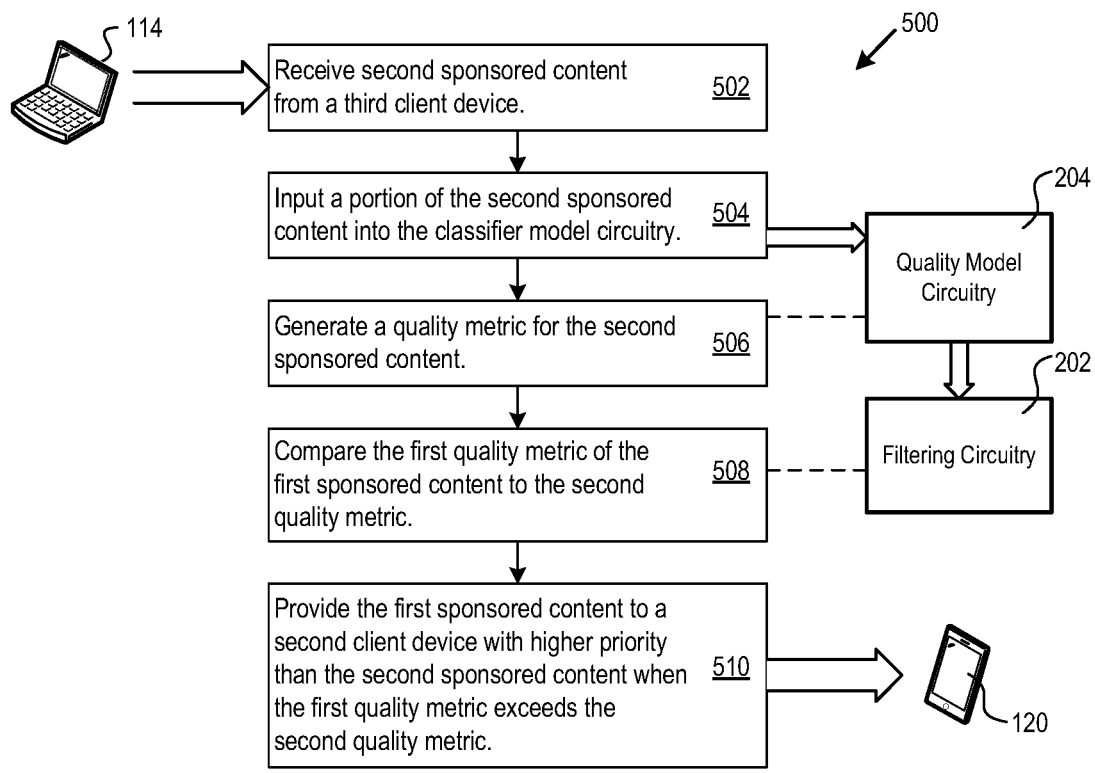
FIG. 5 shows another example flow diagram of logic that the machine may implement.

In another approach, the filtering circuitry 202 may implement a ranking of sponsored content by ranking circuitry 220 of the filtering circuitry 202. Turning now to FIG. 5, an example flow diagram of logic 500 that the filtering machine 100 may implement to provide a ranking system is illustrated. As was discussed above with respect to the first sponsored content, a second sponsored content may be received by the filtering circuitry 202 via the same or similar mechanism (502). In one approach, the second sponsored content is received from a different sponsored content generator 114 as the first sponsored content, thus operating as a third client device in this example. The filtering circuitry 202 may then input a portion of the second sponsored content into the quality model circuitry (504), in response to which the quality model circuitry 204 generates a second quality metric for the second sponsored content (506). Like the first quality metric, the second quality metric is generated in accordance with historical feedback associated with other sponsored content and also based on a plurality of quality factors of the second sponsored content. Ranking circuitry 220 of the filtering circuitry may then compare the first quality metric and the second quality metric to rank the two sponsored contents. In one example, if the first quality metric exceeds the second quality metric (that is to say the first quality metric indicates the first sponsored content is of higher quality than the second sponsored content), then the ranking circuitry 220 will effect provision of the first sponsored content with a higher priority than the second sponsored content (510). For example, the ranking circuitry 220 may assign a rank to the first and second sponsored contents and store the rankings within the sponsored content database 106 or feedback database 210. The rankings may be generated based on bracketed ranges of quality metrics (e.g., a higher rank assigned to sponsored content of a high quality range, a medium rank assigned to sponsored content of middle quality range, etc.). The ranking may be generated based on a comparison of quality metrics assigned to each individual advertisement stored within the sponsored content database 106. In one example, the ranking is a list or table of advertisements sorted according to quality metrics associated with the individual advertisements. After so ranked, service of the various instances of sponsored content may be implemented, at least in part, based on the ranking such that advertisements of higher quality are served with a higher priority (e.g., with greater frequency, given preferential location, etc.) than those of lower quality.

The terms "exceeds a quality threshold" or "higher quality metric" are used herein. However, in one particular implementation, the quality metric is a predictor of the quality of the sponsored content in that it is a probability that the processed sponsored content is of bad quality (e.g., a higher score indicates lower quality for the sponsored content). Thus, in this implementation, although the quality "exceeds" a threshold, the numerical value of the quality metric would operate in inverse and would be below the numerical quality threshold to indicate higher quality sponsored content. Accordingly, upon filtering by the filtering circuitry 202, sponsored content of lesser quality is served with lower priority, is served only when needed, or is altogether prohibited from being served.

Figure 6:
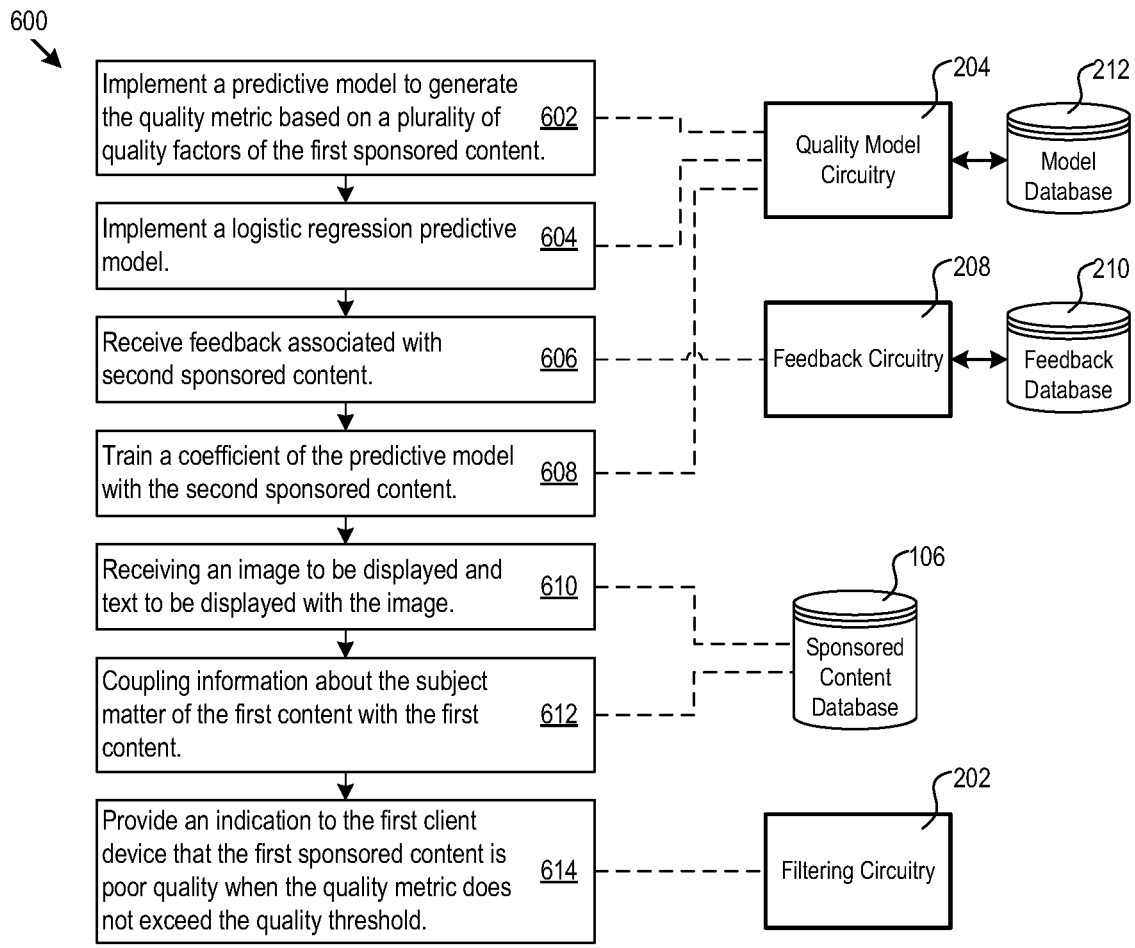
FIG. 6 shows another example flow diagram of logic that the machine may implement.

FIG. 6 illustrates another example flow diagram of logic 600 that the filtering machine 100 may implement in additional or alternative embodiments. As mentioned above, and as discussed below in greater detail, the quality model circuitry 204 may implement a predictive model to generate the quality metric based on a plurality of quality factors of the first sponsored content (602). In a further detailed embodiment, the quality model circuitry 204 may implement a logistic regression predictive model to generate the quality metric based on a plurality of quality factors of the first sponsored content (604). Various example quality factors include image quality factors and/or text quality factors of the first sponsored content. More particular examples include, but are not limited to, an aesthetic appeal factor of the first sponsored content, a trustworthiness factor of the first sponsored content, a brand factor of the first sponsored content, a product/service factor of first sponsored content, a clarity factor of the first sponsored content, or a layout factor of the first sponsored content.

In one approach, the predictive model implemented by the quality model circuitry 204 is trained and/or retrained. For example, at an initial setup stage, the predictive model may be trained with historical advertisements of known bad quality (e.g., as indicated by user feedback received indicating the particular advertisement is offensive or annoying). Periodically, or upon receipt of one or more indications that an instance of sponsored content is of poor quality, the predictive model can be re-trained with the newly received data and/or the poor quality sponsored content. In one example, feedback circuitry 208 receives feedback associated with a second sponsored content (606). The feedback, received from a user on a user device 120 may be generally negative and may include, for example, an indication that the user finds the sponsored content offensive, annoying, in poor taste, repetitive, or not relevant to the user. With this newly received feedback, the quality model circuitry 204 can re-train its predictive model, for example, by retraining at least one coefficient of the predictive model (e.g., as may be stored in model database 212) with the second sponsored content. This provides additional training data with known user-designations with which to refine the predictive model to take into account the aspects (e.g., quality factors) of the second sponsored content when generating quality metrics (e.g., when determining the likelihood that a new sponsored content is bad quality).

The feedback circuitry 208 may be implemented as part of the filtering machine 100 or may be implemented by another server or platform, which communicates its data to the filtering machine 100, e.g., via communication circuitry 200. The feedback database 210 may also store instances of user feedback 216 that are then tied to, point to, or otherwise reference the sponsored content 108 or the copies of the sponsored content 214. The quality model circuitry 204 may access these instances of user feedback 214 and the associated sponsored content 214 or 108.

As discussed above, in certain embodiments, receiving the sponsored content from the sponsored content generators 114 includes receiving an image to be displayed and text to be displayed with the image (610). In some embodiments, the received sponsored content is an advertisement and, more particularly, a native advertisement. The intake circuitry 206 may be configured to couple information about the subject matter of the received first sponsored content (e.g., the identity of the advertiser, the manufacture, the service provider, the brand, the price, timing considerations, etc.) with the first sponsored content (612). This information may be included within the sponsored content database 106, the feedback database 210, or another database. In this manner, additional information not explicitly stated or shown in sponsored content can be included in the analysis performed by the quality model circuitry 204.

After analysis is performed, if the quality metric for a first sponsored content does not exceed the quality threshold, an indication that the first sponsored content or advertisement is deemed poor quality may be provided back to the sponsored content generator 114 via a user interface (e.g., a user interface used to upload the sponsored content), via a messaging system (e.g., email), or via another system or method. A quality score for the first sponsored content (e.g., related to the quality metric) may also be provided to give the sponsored content generator 114 additional information or insight. The system may provide detailed reasoning and/or analysis of the sponsored content with respect to its quality, which may include numerical reports (e.g., broken down by quality factor) or textual descriptions/suggestions (e.g., image too dark, text too long, etc.).

Figure 7:
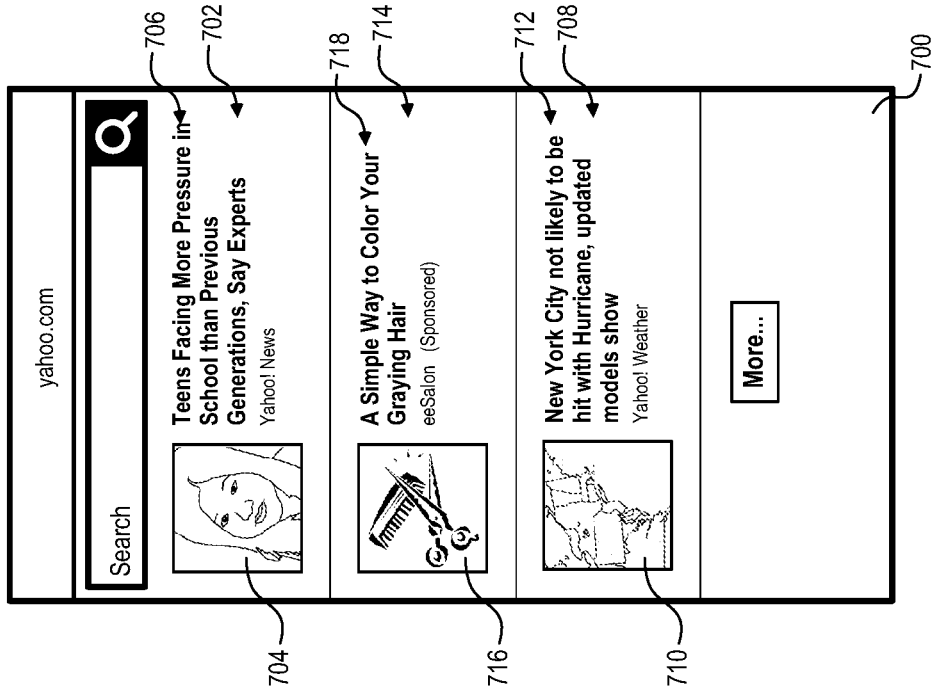
FIG. 7 illustrates an example user interface.

FIG. 7 shows an example user interface 700. The user interface 700 is shown as may be provided to and displayed on a smartphone (e.g., user device 124). The user interface 700 is, in this example, a news feed as may be provided by a web service (yahoo.com in this example). In one approach, the user interface 700 is provided by publisher server 112. The example user interface 700 shows a first content 702 including a first image 704 and associated first text 706. A second content 708 is also shown, including a second image 710 and a second associated text 712. Sponsored content 714 (e.g., an advertisement) is also shown, including a sponsored content image 716 and associated sponsored content text 718. The display of the sponsored content 714 may provide an indication that it is sponsored, such as including the term "sponsored" or "advertisement," a dollar sign or similar indicia, or by providing the sponsored content with a slightly different color of background or text. In this instance, the sponsored content 714 is presented as a native advertisement having a similar format and appearance to other non-sponsored content around it.

Figure 8:
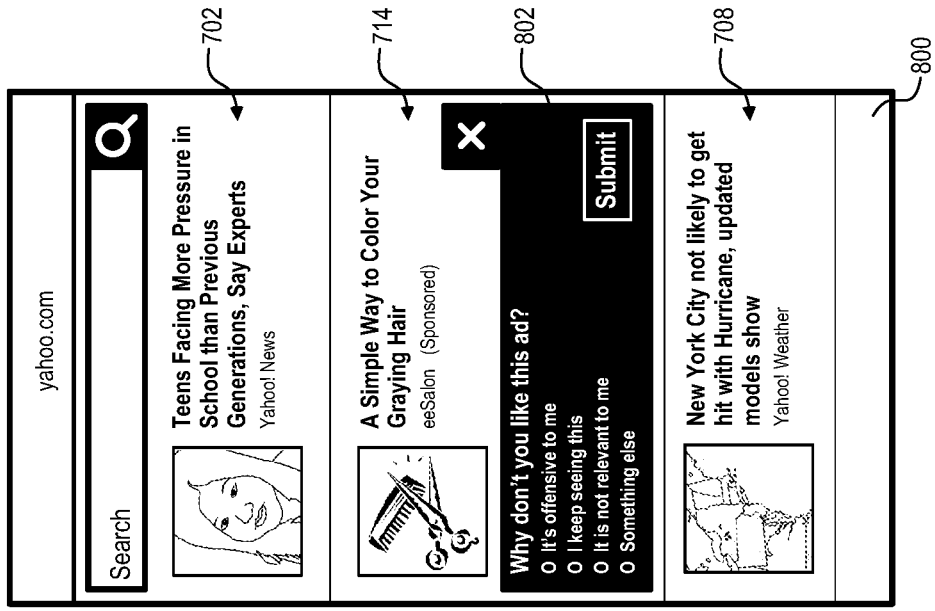
FIG. 8 illustrates a variation of the example user interface of FIG. 7.

FIG. 8 shows a variation on the user interface 800 that allows an end user on a user device 120 to provide feedback to indicate that the sponsored content is of poor quality, that the user does not want to see the sponsored content, or other reasoning. The user interface 800 provides a feedback entry interface 802 to enable the user to provide the feedback back to the server. After submitting the feedback, the feedback entry interface 802, and possibly the sponsored content 714, may disappear. A different sponsored content may possibly be provided in its place, or the non-sponsored content below it may move up to take the place of the sponsored content. The feedback circuitry 208 may receive the submitted user feedback via communication circuitry 200 or through another route, wherein the feedback circuitry 208 can save the receive feedback within the feedback database, which may subsequently be used to retrain the predictive model of the quality model circuitry 204.

Sponsored Content, Advertising, and Native Advertising

Native advertising is a specific form of online advertising where ads replicate the look-and-feel of their serving platform. In such a context, providing a positive user experience with the served ads may be important to ensuring long-term user engagement with the online platform. In online services, native advertising includes advertising where the ads served reproduce the look and feel of the platform in which they appear. Example online native ads include suggested posts on Facebook, promoted tweets on Twitter, or sponsored contents on Yahoo news stream (see FIGS. 7 and 8). Native ads tend to be more effective than traditional display ads in terms of user attention and purchase intent, and cause much less prominent ad blindness effect.

To improve the effectiveness of native ads, an ad serving systems should provide ads that satisfy an end user's needs according to two aspects: relevance and quality. Relevance is the extent to which an ad matches user interests. Relevant ads should be personalized according to the target user preferences, browsing patterns, search behavior, etc. Quality, however, is a unique characteristic of the ad or sponsored content itself, and can be independent of the individual users targeted by the platform. The quality of an ad reflects the nature of the advertised product and the design decisions of the advertiser or sponsored content generator 114, and affects the experience of any user exposed to the ad. The ad quality may depend on, for example, the visual composition of the ad creative, the clarity and trustworthiness of the text in the ad copy or the landing page, or the adultness of the ad content.

Promoting relevant and high quality ads to users can improve long-term user engagement with the platform. In particular, low-quality advertising (the promotion of low quality ads) can have a detrimental effect on long-term user engagement. In display advertising, for example, excessive animation or high level of intrusiveness can have an undesirable impact on the ad effectiveness. In addition, disturbing ads can cause various issues beyond mere annoyance, as users might get distracted, or unable to consume the actual content of the page where the ad is displayed.

Low quality advertising can have even more direct consequences in the context of native advertising, since native advertisement forms an integrated part of the user experience of the webpage product. For example, a poor post-click quality (quantified by a short dwell time on the ad landing page) in native ads can result in weaker long-term engagement (e.g. fewer clicks). Due to the low variability in terms of ad formats in native advertising, the content and the presentation of the ad creative are extremely important to determine the quality of the ad. Thus, one objective of the present disclosure is to counter low quality native advertising. In certain embodiment, this process is independent of the relevance of ads provided to the user or the targeting algorithm used for ad serving. In one approach, the filtering machine 100 focuses on pre-click user experience of the native ad, that is, the user experience induced by the ad creative before the user decides to (or not to) click.

Pre-Click Ad Quality

Many prior art approaches utilize click-through rate (CTR) as a metric (learning target, e.g., for a predictive model) to predict pre-click ad quality. However, CTR only reflects short-term user engagement. Although CTR is loosely related to the ad quality, high CTR may not imply good ad quality. CTR is a compounding factor that may be affected by several dimensions, including ad relevance, the nature of the advertiser (e.g. its popularity or seasonality) and, the ad quality. In addition, high CTR may not necessarily correspond to high quality advertisements. For example, many ads labeled as poor quality or offensive could be seen as "provocative", thereby attracting clicks (e.g., high CTR, but low quality). Further, serving ads predicted to have high CTR focuses on short-term revenue, and does not guarantee long-term user engagement with the platform. In one approach, to quantify a bad pre-click user experience, alternative quality metrics are used, namely negative ad feedback. Examples of negative ad feedback may include user feedback that an ad is offensive, annoying, etc. In one particular example, ad offensiveness is utilized, which can be used to generate an offensive feedback rate (OFR).

From received negative feedback, a subset of ads that received a minimum number of feedbacks greater than a given threshold (e.g., five negative feedbacks) can be selected. The minimum threshold helps eliminate random or unintentional negative feedback. From the collected data, an Offensive Feedback Rate (OFR) can be calculated:

$$OFR = freq_{off}/freq_{impr}$$

where $freq_{off}$ represents the number of offensive ad feedbacks registered by the feedback circuitry 208, and $freq_{impr}$ denotes the number of ad impressions (the number of impressions users saw the ad) within a time period. OFR quantifies the percentage of the ad impressions that offended the users. A shape of log (OFR) may be similar to a normal distribution with most of the ads having quite small OFR and a few having relatively high OFR.

Pre-Click Ad Quality Factors

Some example quality factors are: Aesthetic appeal, Product, Brand, Trustworthiness, Clarity, and Layout (this list is provided in descending order of importance in accordance with one embodiment). However, the importance can vary across differing categories. For example, Aesthetic appeal may be more important, for example, with Automotive, Beauty and Education markets, than with Personal Finance and Travel. For example, for the Travel category, where most ad images are beautiful, differences in aesthetics does not affect quality determinations as compared to other factors. In another example, for Beauty and Education categories, the product advertised is one factor (other than aesthetic appeal) that affects user's assessments; for Automotive, the brand may be important. For Personal Finance category, the clarity of the description may have a big impact on the user's perception of the pre-click ad quality.

The example quality factors may be divided into two sets of quality factors. A first set can be labelled cold-start factors as they do not require prior knowledge about how users interact with the ad. These cold-start quality factors may be mined from the ad creatives, including the ad copy, the images, and the advertiser characteristics (e.g., information about the advertiser and/or the subject matter of the ad). An overview of the cold-start quality factors is shown in Table 1. A second set of quality factors can be based on the user behavior (e.g. dwell time) after the ads were served, which are shown in Table 2.

Cold-Start Ad Features

Clarity—The clarity of the ad reflects the ease with which the ad text (title or description) can be understood by a reader. The readability of the ad copy text may be measured with several readability metrics. From both the ad title and description, for example, Flesch's reading ease test, Flesch-Kincaid grade level, the Gunning fog index, the Coleman-Liau index, the Laesbarheds index and RIX index can be computed, for example, with processors 306. These metrics are defined according to a set of low-level text features, such as the number of words, the percentage of complex words, the number of sentences, number of acronyms, number of capitalized words and syllables per words. For completeness, these low-level statistics may be retained as additional clarity features.

Trustworthiness—Another aspect of ad quality is its trustworthiness, namely the extent to which users perceive the ad as reliable. This dimension can be represented by analyzing different psychological reactions that users might experience when reading the ad creative. Information can be mined, for example, by processors 306, about the sentiment value of the text, its psychological incentives, and the language style and usage in the ad copy.

Sentiment and Psychological Incentives—Sentiment analysis tools automatically detect the attitude of a speaker or a writer with respect to a topic, or the overall contextual polarity of a text. To determine the polarity (positive, negative) of the ad sentiment, the ad title and description can be analyzed with SentiStrength, an open source sentiment analysis tool, which may be implemented by processors 306. For a sentence, SentiStrength reports two values, the probabilities (on a 5-scale grade) of the text sentiment being positive and negative, respectively.

The words used in the ad copy could have different psychological effects on the users. To capture these, in one embodiment, the LIWC 2007 dictionary may be utilized, which associates psychological attributes to common words (or another similar reference). For example, words categorized as social, affective, cognitive, perceptual, biological, personal concerns and relativity may be reviewed. For both the ad title and the description, the frequency of the words that the LIWC dictionary associates with each of these seven categories may be retained as Psychological Incentives features.

Content Coherence—The consistency between ad title and ad description may also affect the ad trustworthiness. The cosine similarity between the bag of word vectors of the ad title and ad description may be calculated, for example, by processors 306.

Language Style—To reflect the stylistic dimension of the ad text, the degree of formality of the language in the ad may be analyzed, for example, using processors 306, using a linguistic formality measure and a proprietary learned formality classifier. The linguistic formality weights different types of words, with nouns, adjectives, articles and prepositions as positive elements, and adverbs, verbs and interjections as negative. A classifier may be based on linguistic features designed on top of the SpaCy NLP toolkit, such as text readability, n-gram counts, constituency, part-of-speech, lexical features, casing and punctuation, entity, subjectivity (TextBlob NLP) and Word2Vec13 features. Low-level features, such as the frequency of punctuation, numbers, "5W1H" words (who, what, where, when, why, how), superlative adjectives or adverbs, may also be included and processed, for example, with processors 306.

Language Usage—To understand the language usage of ad textual content, the text is parsed using a proprietary content analysis platform (CAP), for example implemented with processors 306. The CAP underlying classifiers are based on natural language processing techniques modeling the general usage of the language. Two classifiers may be important: spam and hate speech. The spam score reflects the likelihood of a text to be of spamming nature and utilizes a set of content and style based features. The hate speech score captures the extent to which any speech may suggest violence, intimidation or prejudicial action against/by a protected individual or group.

The ad title is written to grasp users' attention. Advertisers often choose catchy word combinations to persuade users to click on the ad creative. To measure the attractiveness of the ad title, a set of features originally used to train a proprietary learned click bait classifier may be analyzed, including a set of low-level features (e.g. whether the text contains slang or profane words), sentiment values and bag-of-words analysis. The frequency counts of words relating to slang and profanity may be retained as trustworthiness features. These attractiveness factors may be processed with processors 306.

Product/Service

Although quality is independent to relevance, some ad categories might be considered lower quality (e.g., more offensive) than others, and some quality factors may be more important for some types of products/services.

Text—To capture the topical categories of the product or service provided by the ad, a proprietary text-based classifier, Yahoo Category Taxonomy (YCT), may be used that computes, given a text, a set of category scores (e.g. sports, entertainment) according to a topic taxonomy (e.g., top-level categories). This group may be added to the adult score as extracted from the CAP, that suggests whether the product advertised is related to adult-related products or services, such as dating websites.

Image—To understand the content of the ad creative from a visual perspective, the ad image may be tagged with machine tags (e.g., from Flickr or another photo program), namely deep-learning based computer vision classifiers that automatically recognize the objects depicted in a picture (e.g., a person, a flower). For each of the detectable objects, the Flickr classifiers output a confidence score corresponding to the probability that the object is represented in the image. Since tag scores are very sparse (an image shows few objects), similar tags may be grouped semantically into topically-coherent tag clusters (e.g., dog, cat will fall in the animal cluster), and the raw tag confidence scores can be aggregated at a cluster level. Examples of the clusters include "plants", "animals". A deep-learning proprietary adult image detector may also be run, and the output confidence score may be retained as an indicator of the adultness of the ad creative.

To further capture the underlying semantics of the image, richer visual descriptions may be obtained from the CNN (Convolutional Neural Networks)-based Flickr classifiers. For example, a 4096-dimensional feature vector corresponding to the outputs of the 4096 neurons of the 2nd-last layer of the deep learning network generating the Flickr machine tags may be extracted. To reduce dimensionality, feed-forward feature selection may be performed, and the top 50 discriminative CNN features may be retained for ad offensiveness detection.

Layout

Text—Since the ad format of the native ads served on a given platform is fixed, the textual layout of the ad creative may be captured by looking at the length of the ad creative copy text (e.g. number of sentences or words).

Image—To quantify the composition of the ad image, the spatial layout in the scene may be analyzed using compositional visual features inspired by computational aesthetics research. For example the image may be resized to a squared matrix Iij, and a symmetry descriptor may be computed based on the gradient difference between the left half of the image and its flipped right half. The image may be analyzed to determine if it follows the photographic Rule of Thirds, according to which important compositional elements of the picture should lie on four ideal lines (two horizontal and two vertical) that divide it into nine equal parts, using saliency distribution counts to detect the Object Presence. Finally, the Depth of Field, which measures the ranges of distances from the observer that appear acceptably sharp in a scene, may be observed using wavelet coefficients. An image text detector may capture whether the image contains text in it. These various image processing steps may be performed by processors 206 in various embodiments.

Aesthetic Appeal

To explore the contribution of visual aesthetics for ad quality, computational aesthetics may be utilized, which is a branch of computer vision that studies ways to automatically predict the beauty degree of images and videos. Computational aesthetics uses compositional visual features to train "beauty" classifiers. In a similar manner, compositional features may be extracted from the ad images.

Color—Color patterns may be important cues to understand the aesthetic value of a picture. To describe the color palette, a luminance-based Contrast metric may first be computed that reflects the distinguishability of the image colors. The average Hue, Saturation, Brightness (H,S,V) may be extracted by averaging HSV channels of the whole image and HSV values of the inner image quadrant. Average Saturation ($S^-$) and Brightness ($V^-$) values may be linearly combined to obtain three indicators of emotional responses: Pleasure, Arousal and Dominance. In addition, the HSV values may be quantized into twelve (12) Hue bins, five (5) Saturation bins, and three (3) Brightness bins and collect the pixel occurrences in the HSV Itten Color Histograms. Finally, Itten Color Contrasts may be computed as the standard deviation of H, S and V Itten Color Histograms. Such computations may be carried out by the processors 306 in various embodiments.

Texture—To describe the overall complexity and homogeneity of the image texture, the Haralick's features may be extracted from the Gray-Level Co-occurrence Matrices, namely the Entropy, Energy, Homogeneity, Contrast.

Photographic Quality

These features describe the image quality and integrity. High-quality photographs are images where the degradation due to image post-processing or registration is not highly perceivable. To determine the perceived image degradation, a set of simple image metrics originally designed for computational portrait aesthetics may be extracted, independent of the composition, the content, or its artistic value. These simple image metrics may include:

Contrast Balance—The contrast balance may be computed, for example, by processors 306, by taking the distance between the original image and its contrast-equalized version.

Exposure Balance—To capture over/under exposure, the luminance histogram skewness may be computed, for example, by processors 306.

JPEG Quality—When too strong, JPEG compression can cause disturbing blockiness effects. An objective quality measure for JPEG images may be computed, for example, by processors 306.

JPEG Blockiness—This detects the amount of 'blockiness' based on the difference between the image and its compressed version at low quality factor, as may be computed by processors 306.

Sharpness—The image sharpness may be detected by processors 306 aggregating the edge strength after applying horizontal or vertical Sobel masks (Teengrad's method).

Foreground Sharpness—The Sharpness metric may be computed by processors 306 on salient image zones of the image, and, in some embodiment, on salient image zones only.

Brand—These features reflect the advertiser characteristics. In some embodiments, the intrinsic properties of the advertiser (such as the brand) have an effect of the user perception of ad quality. Two example features may be extracted: domain pagerank and search volume. The domain pagerank is the pagerank score of the advertiser domain for a given ad landing page, which can be obtained by mining the web crawl cache (WCC) data, which contains the pagerank score for any given URLs crawled. The search volume reflects the raw search volume of the advertiser within a big commercial search engine, which may represent the overall popularity of the advertiser and its product/service.

Table 1, provided below, provides a summary of the Cold-Start Quality Factors discussed above.

TABLE 1

| | | Pre-Click Ad Quality: Cold-Start Quality Factors | | | |
|---|---|---|---|---|---|
| User Reasons | Quality Factor | Feature | Dim | Description | Feature Source |
| Clarity | Readability | Flesch's reading ease test | 2 | Combination of number of words per sentence and syllables per words | Ad Copy |
| | | Flesch-Kincaid grade level | 2 | Combination of number of words per sentence and syllables per words | |
| | | Gunning fog index | 2 | Combination of number of words per sentence and percentage of complex words | |
| | | Coleman-Liau index | 2 | Combination of number of letters per words and average number of sentences per words | |
| | | Laesbarheds index | 2 | Combination of number of words per sentence and number of long words (words over six characters) | |
| | | RIX index | 2 | number of long words (words over six characters) per sentences | |
| | | number of capitalized words | 4 | number of capitalized words, and whether text contains at least one capitalized words | |
| | | number of acronyms | 4 | number of acronyms, and whether text contains at least one acronyms | |
| | | words per sentence | 2 | number of words per sentence | |
| | | percentage of complex words | 2 | complex words contain three or more syllables | |
| | | syllables per words | 2 | Number of syllables per words | |
| Trust-worthiness | Psychology | Positive Polarity | 2 | Sentistrength positive polarity classification based on 298 positive terms in the sentiment word strength list | |
| | | Negative Polarity | 2 | Sentistrength negative polarity classification based on 465 negative terms in the sentiment word strength list | |
| | | Aggregated Polarity | 2 | Sum of Sentistrength positive and negative polarity for the overall polarity | |
| | | Psychological Incentives | 14 | Frequency of words relating to social, affective, cognitive, perceptual, biological, relativity, personal concerns in the LIWC dictionary | |
| | Content Coherence | title-description similarity | 1 | Similarity between texts of ad title and description | |
| | Language Style | Formality | 2 | formality f-score based on the frequencies of different word classes (part-of-speech) and machine learning based formality classifier trained on various features | |
| | | Punctuation | 6 | number of different punctuation marks, including exclaim point '!', question mark '?' and quotes | |
| | | start with number | 2 | whether text starts with number | |
| | | contain non-starting number | 2 | whether text contains number that does not start with the text | |
| | | start with 5W1H | 1 | whether text starts with \what", \where", \when", \why", \who" and \how" | |
| | | contain superlative | 1 | whether text contains a superlative adverb or adjective | |
| | Language Usage | Spam | 1 | Likelihood of text to be classified as spam from CAP (trained on HTML web documents) | |

TABLE 1-continued

Pre-Click Ad Quality: Cold-Start Quality Factors

| User Reasons | Quality Factor | Feature | Dim | Description | Feature Source |
|---|---|---|---|---|---|
| | | Hate speech | 1 | Likelihood of text to contain abusive speech targeting specific group characteristics, such as ethnicity, religion, or gender, from CAP | |
| | | Click bait | 3 | likelihood of text to be classified as click bait, exploiting a learned prediction model based on a set of low-level, sentiment and bag-of words features | |
| | | number of slang words | 2 | number of slang words used (defined in a word list) | |
| | | number of profane words | 2 | number of profane words used (defined in a word list) | |
| Product/ Service | Content | YCT (text) | 21 | Likelihood of the most top level YCT (Yahoo Category Taxonomy, e.g. sports) the text to be classified from CAP | Ad Copy and Image |
| | | Adult (text) | 1 | Likelihood of text to contain adult contents from CAP | |
| | | Adult (image) | 1 | Likelihood of image to contain adult related images (e.g. too much skin) | |
| | | Image Object Taxonomy | 1 | Likelihood of image to contain objects within a given topical category (such as plant, man-made objects) | |
| | | Image CNN classifier | 50 | Likelihood of image to contain deep learning based objects based on the second last layer of the Convolutional Neural Networks (CNN) | |
| Layout | Readability | Number of sentences | 2 | Number of sentences | |
| | | Number of words | 2 | Number of words | |
| | Composition | Presence of Objects | 9 | Amount of saliency in 9 image quadrants | |
| | | Uniqueness | 1 | Difference between the image spectral signal and the average spectrum of natural images | |
| | | Symmetry | 1 | Difference between the HOG [6] feature vectors of the image left-half and right-half | |
| | | Depth of Field | 12 | Low DOF indicators based on haar wavelets | |
| | | Image text detector | 1 | Likelihood of image to contain text | |
| Aesthetic Appeal | Colors | Contrast | 1 | Ratio between the sum of max and min luminance values and the average luminance | Ad Image |
| | | H, S, V | 3 | Average Hue, Saturation, Brightness computed on the whole image | |
| | | H, S, V (Central Quadrant) | 3 | Average Hue, Saturation, Brightness computed on the central quadrant | |
| | | H, S, V Color Histograms | 20 | Histograms of H, S and V values quantized over 12, 3, and 5 bins | |
| | | H, S, V contrasts | 3 | Standard deviation of the HSV Color Histograms distributions | |
| | | Pleasure, Arousal, Dominance | 3 | Based on average HSV combinations | |
| | Textures | GLCM Properties | 4 | Entropy, Energy, Contrast, and Homogeneity of the Gray-Level Co-occurrence Matrix | |
| | Photographic Quality | Contrast Balance | 1 | Distance between original and contrast-normalized images | |
| | | Exposure Balance | 1 | Absolute value of the luminance histogram skewness | |
| | | JPEG Quality | 1 | No-reference quality estimation algorithm in [37] | |

TABLE 1-continued

Pre-Click Ad Quality: Cold-Start Quality Factors

| User Reasons | Quality Factor | Feature | Dim | Description | Feature Source |
|---|---|---|---|---|---|
| | | JPEG Blockiness | 1 | JPEG artifacts detection based on image re-compression. | |
| | | Sharpness | 1 | Sum of the image pixels after applying horizontal/vertical Sobel masks | |
| | | Foreground Sharpness | 1 | Sum of the image pixels after applying horizontal/vertical Sobel masks on the salient image zones | |
| Brand | Brand Quality | Advertiser Domain Pagerank | 1 | the WCC pagerank score of the top level domain of the ad landing page | Advertiser |
| | | Advertiser Search Volume | 2 | the number of Yahoo search query volume given the advertiser name or the sponsored by label | |

User Behavior Features

The above quality factors are cold-start quality factors, i.e. they do not consider the interactions ad-users after the ad is consumed. However, after serving the ad, informative user behavior signals can be collected which, in some embodiments, may aide in determining the pre-click quality of ads. To this end, user behavior features related to the pre-click experience (click-through rate on the ad creative) may be captured. Also, the user behavior with respect to the post-click experience may be examined, for example, using bounce rate and average dwell time, which may be a good proxy of the quality of ad landing pages. In some approaches, a bad quality ad creative may be likely to have a bad landing page. Table 2, provided below, provides a summary of the User Engagement Quality Factors discussed above.

TABLE 2

Pre-Click Ad Quality: User Engagement Quality Factors

| User Reasons | Quality Factor | Feature | Dim | Description | Feature Source |
|---|---|---|---|---|---|
| Engagement | Pre-click | Click-through Rate (CTR) | 1 | The number of ad clicks divided by the number of ad impressions | User Behavior |
| | Post-click | Dwell Time | 1 | The average dwell time of the ad landing page | |
| | | Bounce Rate | 1 | The fraction of sessions with ad landing page dwell time shorter than five seconds | |

Ad Quality Predictive Model

Predictive Model. Using negative feedback (e.g., offensive feedback) can be used to determine "low quality" ads. The offensiveness prediction may be used as a binary classification task. All ads that fall within the fourth quartile of the OFR distribution may be considered as positive (the offensive ads). To ensure reliable OFR within the positive training examples, ads marked as offensive at least five times may be selected to eliminate random or unintentional feedback.

In one approach, logistic regression may be utilized to teach or train the predictive model. Logistic regression is parameterized through a weight vector w. Assume that the posterior pre-click quality probabilities can be estimated through a linear combination of the input features x, passed through a sigmoidal function:

$$P(y = 1 \mid x) = f(x, w) = \frac{1}{1 + \exp(-x^T w)}$$

To estimate the parameters w, the loss function is minimized:

$$\min_{w \in R^K} \frac{1}{N} \sum_{i=1}^{N} m_i (y_i - f(x_i, w))^2 + \lambda \|w\|_1$$

where the hyper parameter $\lambda$ controls the L1-regularization, introduced to induce sparsity in the parameter vector, thus reducing the feature space to a subset of discriminative features. To overcome the problem of imbalanced training set (there are more "non-offensive" than offensive ads), the SMOTE method may be used. To over-sample the minority class (offensive), synthetic examples can be generated in the neighborhood of the observed offensive ads, by interpolating between examples of the same class. Other modeling approaches may be utilized in various embodiments are and contemplated by this disclosure. For example, Given the trained logistic regression model, the posterior pre-click ad quality probabilities can be estimated as $f(xi, w) \in [0, 1]$, and the predicted class $y_i$ (offensive, not offensive) can be obtained by thresholding the obtained probabilities: $y_i=\text{sign}(f(x_i, w)-\theta)$, where threshold $\theta$ can be set to 0.5. However, $\theta$ can be chosen anywhere between 0 and 1 to ensure desired precision. Five-fold cross-validation may be used to train and test the predictive model.

Performance (in terms of AUC, area under the ROC curve), may be expected with an AUC as high as 0.79 using all quality factors, and an AUC as high as 0.77 using only the cold-start quality factors. In initial examples, some more influential quality factors relate to trustworthiness (language usage, style and sentiment), the product/service provided, the brand (advertisers' page rank) and the layout (composition of the ad creative image). In particular, the Spam Score and the use of superlative words may be among the highest indicators of offensiveness.

As is understood from the above, the embodiments discussed herein disclose system and methods for determining pre-click ad quality of advertisements and/or sponsored content, to detect poor quality advertisements and sponsored content, which can be performed before the ads are served to user devices. The ad quality prediction extends beyond text-only features, and further utilizes visual features extracted from an ad creative image. In a certain embodiment, the system and methods determine the pre-click quality of native advertisements, which adhere to stricter quality requirements. Unlike display ads, native ads follow a standard format dictated by the platform, thus con-straining the diversity of computable visual features, making predicting pre-click quality harder with native advertisements. In addition, unlike native ads, display ads do not contain textual description surrounding the main image. Accordingly, the present embodiments discuss the use of a multimodal model for ad quality prediction focusing on both various textual and visual features (such as text formality or image foreground sharpness) which have not been evaluated before elsewhere.

The present disclosure contemplates a computer-readable medium that includes instructions or receives and executes instructions responsive to a propagated signal, so that a device connected to a network can communicate voice, video, audio, images or any other data over a network, and/or perform any features or functionalities disclosed herein. A "computer-readable medium," "machine readable medium," "propagated-signal" medium, and/or "signal-bearing medium" may comprise any device that includes, stores, communicates, propagates, or transports instructions, code, or software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method comprising:
   receiving, at filtering circuitry via communication circuitry, first sponsored content from a first client device;
   inputting, by the filtering circuitry, at least a portion of the first sponsored content into quality model circuitry;
   extracting textual features from the first sponsored content;
   determining a trustworthiness factor of the first sponsored content based upon an analysis of:
      coherence corresponding to the textual features of the first sponsored content, wherein the coherence is determined based upon a cosine similarity between bag of word vectors of a title of the first sponsored content and a description of the first sponsored content;
   generating, by the quality model circuitry, a quality metric for the first sponsored content based upon (i) historical feedback associated with other sponsored content and (ii) the trustworthiness factor of the first sponsored content;
   comparing, by the filtering circuitry, the quality metric to a quality threshold; and
   effecting provision of the first sponsored content to a second client device for display on the second client device when the quality metric exceeds the quality threshold.

2. The method of claim 1 comprising:
   implementing, by the quality model circuitry, a predictive model to generate the quality metric based upon a plurality of quality factors of the first sponsored content.

3. The method of claim 1 comprising:
   analyzing the first sponsored content to identify visual features of the first sponsored content.

4. The method of claim 3 comprising:
   determining an aesthetic appeal factor of the first sponsored content based upon the visual features of the first sponsored content, wherein the quality metric for the first sponsored content is generated based upon the aesthetic appeal factor of the first sponsored content.

5. The method of claim 1 comprising:
   analyzing the first sponsored content to identify advertiser characteristics of an advertiser of the first sponsored content.

6. The method of claim 1 comprising:
   analyzing the first sponsored content to identify features of the first sponsored content.

7. The method of claim 5 comprising:
   determining a brand factor of the first sponsored content based upon the advertiser characteristics of the advertiser of the first sponsored content, wherein the quality metric for the first sponsored content is generated based upon the brand factor of the first sponsored content.

8. The method of claim 6 comprising:
   determining a product/service factor of the first sponsored content based upon the features of the first sponsored content.

9. The method of claim 8 wherein the quality metric for the first sponsored content is generated based upon the product/service factor of the first sponsored content.

10. A machine comprising:
    communication circuitry coupled to at least one network and configured to receive first sponsored content from a first client device;
    quality model circuitry; and
    filtering circuitry coupled to the communication circuitry and to the quality model circuitry, the filtering circuitry configured to:
       receive the first sponsored content from the communication circuitry;
       input at least a portion of the first sponsored content into the quality model circuitry;
       receive from the quality model circuitry a quality metric for the first sponsored content;
       compare the quality metric to a quality threshold; and
       effect provision of the first sponsored content to a second client device for display on the second client device when the quality metric exceeds the quality threshold;
    wherein the quality model circuitry is configured to generate the quality metric for the first sponsored content based upon (i) historical feedback associated with other sponsored content and (ii) a trustworthiness factor of the first sponsored content determined based upon an analysis of coherence corresponding to textual features of the first sponsored content, wherein the coherence is determined based upon a cosine similarity between bag of word vectors of a title of the first sponsored content and a description of the first sponsored content.

11. The machine of claim 10 wherein the trustworthiness factor is determined based upon an analysis of language style of the first sponsored content.

12. The machine of claim 11 wherein the language style corresponds to at least some of the textual features of the first sponsored content.

13. The machine of claim 11 wherein the language style corresponds to a formality of at least some of the textual features of the first sponsored content.

14. The machine of claim 13 wherein the formality of at least some of the textual features of the first sponsored content is determined based upon a frequency of at least one of one or more numbers, one or more superlative adjectives or one or more superlative adverbs.

15. The machine of claim 13 wherein the formality of at least some of the textual features of the first sponsored content is determined based upon a weighting of adverbs as negative elements.

16. The machine of claim 13 wherein the formality of at least some of the textual features of the first sponsored content is determined based upon a weighting of prepositions as positive elements.

17. The machine of claim 13 wherein the formality of at least some of the textual features of the first sponsored content is determined based upon a weighting of articles as positive elements.

18. A method comprising:
- receiving, at filtering circuitry via communication circuitry, first sponsored content from a first client device and second sponsored content from a third client device;
- inputting, by the filtering circuitry, at least a portion of the first sponsored content and at least a portion of the second sponsored content into quality model circuitry;
- implementing, by the quality model circuitry, a predictive model;
- generating, by the quality model circuitry, a first quality metric for the first sponsored content based upon (i) historical feedback associated with other sponsored content and (ii) a trustworthiness factor of the first sponsored content determined based upon an analysis of coherence corresponding to textual features of the first sponsored content, wherein the coherence is determined based upon a cosine similarity between bag of word vectors of a title of the first sponsored content and a description of the first sponsored content;
- generating, by the quality model circuitry, a second quality metric for the second sponsored content based upon (i) the historical feedback associated with the other sponsored content and (ii) a second trustworthiness factor of the second sponsored content;
- comparing, by the filtering circuitry, the first quality metric and the second quality metric; and
- effecting provision of the first sponsored content to a second client device for display on the second client device with higher priority than the second sponsored content when the first quality metric of the first sponsored content exceeds the second quality metric of the second sponsored content.

19. The method of 18 comprising:
- receiving, by feedback circuitry, negative feedback associated with third sponsored content; and
- training, by the quality model circuitry, a coefficient of the predictive model with the third sponsored content.

20. The method of 18 wherein the first sponsored content comprises a native advertisement comprising an image to be displayed and text to be displayed with the image.

* * * * *